United States Patent
Szabo et al.

(10) Patent No.: US 11,550,297 B2
(45) Date of Patent: Jan. 10, 2023

(54) METHODS AND ARRANGEMENTS FOR ROBOT DEVICE CONTROL IN A CLOUD

(71) Applicant: Telefonaktiebolaget LM Ericsson (publ), Stockholm (SE)

(72) Inventors: Geza Szabo, Kecskemet (HU); Attila Báder, Paty (HU); Sándor Rácz, Cegléd (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 399 days.

(21) Appl. No.: 16/618,828

(22) PCT Filed: Jul. 11, 2017

(86) PCT No.: PCT/EP2017/067418
§ 371 (c)(1),
(2) Date: Dec. 3, 2019

(87) PCT Pub. No.: WO2019/011416
PCT Pub. Date: Jan. 17, 2019

(65) Prior Publication Data
US 2021/0026329 A1     Jan. 28, 2021

(51) Int. Cl.
*G05B 19/4155*     (2006.01)
*B25J 9/16*     (2006.01)
(Continued)

(52) U.S. Cl.
CPC ........ *G05B 19/4155* (2013.01); *B25J 9/1664* (2013.01); *B25J 9/1689* (2013.01);
(Continued)

(58) Field of Classification Search
CPC ... B25J 9/1664; B25J 9/1689; G05B 19/4155; G05B 2219/40174; G05B 2219/40314;
(Continued)

(56) References Cited

U.S. PATENT DOCUMENTS 6,684,257 B1 *   1/2004   Camut ............... H04L 67/2819
                                                    709/217
8,798,791 B2    8/2014   Li et al.
(Continued)

FOREIGN PATENT DOCUMENTS

| CN | 102546798 A * | 7/2012 |
|---|---|---|
| EP | 2835231 A1 | 2/2015 |
| KR | 20120035382 A * | 4/2012 |

OTHER PUBLICATIONS

Tian et al. "A Cloud Robot System Using the Dexterity Network and Berkeley Robotics and Automation as a Service (Brass)", 2017 IEEE International Conference on Robotics and Automation (ICRA), pp. 1615-1622 (Year: 2017).*
(Continued)

*Primary Examiner* — Dale Moyer
(74) *Attorney, Agent, or Firm* — Coats & Bennett, PLLC

(57) ABSTRACT

The present disclosure relates to a first Web server (102, 204, 60, 70) and a second Web server (108, 214, 80, 90), and methods therein for controlling of a robot device over a cloud interface. A hyper-text transfer protocol, HTTP, request for a trajectory between a start position and a goal position is sent (S120, S230, 302, 402) towards the second Web server. One or more calculated trajectories are obtained (S122, 304) based on information as received encoded in the request. A HTTP response is sent (306) towards the first WEB server, comprising one or more calculated trajectories. Executing (S126, S266; 308, 406) of a trajectory at least based said one or more of the received trajectories is performed by the first Web server (102, 204, 60, 70). A scalable robot device control method is thus proposed, which is advantageously uses stored calculated trajectories between start and goal positions, for the robot device.

13 Claims, 5 Drawing Sheets

(51) Int. Cl.
  *H04L 67/02* (2022.01)
  *H04L 67/146* (2022.01)
  *H04L 67/12* (2022.01)

(52) U.S. Cl.
  CPC ............ *H04L 67/02* (2013.01); *H04L 67/146* (2013.01); *G05B 2219/40174* (2013.01); *H04L 67/12* (2013.01)

(58) Field of Classification Search
  CPC . G06F 2209/509; G06F 9/5027; H04L 67/02; H04L 67/12; H04L 67/146
  See application file for complete search history.

(56) References Cited

U.S. PATENT DOCUMENTS

| | | | |
|---|---|---|---|
| 9,031,692 B2 | 5/2015 | Zhu | |
| 2011/0071672 A1 | 3/2011 | Sanders et al. | |
| 2011/0106308 A1* | 5/2011 | Eliasson | B25J 9/1664 700/250 |
| 2012/0165978 A1 | 6/2012 | Li et al. | |
| 2013/0166621 A1 | 6/2013 | Zhu | |
| 2014/0108463 A1 | 4/2014 | Gagliardi et al. | |
| 2016/0150053 A1 | 5/2016 | Janczuk et al. | |
| 2016/0373789 A1* | 12/2016 | Tsukagoshi | H04N 21/85406 |

OTHER PUBLICATIONS

KR-20120035382-A Translation (Year: 2012).*
CN-102546798-A Translation (Year: 2012).*
Remy, S. et al., "Distributed Service-Oriented Robotics", IEEE Internet Computing, vol. 15, Mar. 1, 2011, pp. 70-74, IEEE.
Du, Z. et al., "Robot Cloud: Bridging the Power of Robotics and Cloud Computing", Future Generation Computer Systems, vol. 74, Sep. 1, 2017, pp. 337-348, Elsevier.
Tian, N. et al., "A Cloud Robot System Using the Dexterity Network and Berkeley Robotics and Automation as a Service (Brass)", 2017 IEEE International Conference on Robotics and Automation (ICRA), May 29, 2017, pp. 1615-1622, IEEE.
Waibel, M. et al., "RoboEarth: A World Wide Web for Robots", IEEE Robotics & Automation Magazine, vol. 18 No. 2, Jun. 1, 2011, pp. 69-82, IEEE.
Inaba, M., "Remote-Brained Robots", Proceedings of the Fifteenth International Joint Conference on Artificial Intelligence, vol. 2, Aug. 23, 1997, pp. 1593-1606, IJCAI.
Agostinho, L. et al., "A Cloud Computing Environment for Supporting Networked Robotics Applications", 2011 IEEE Ninth International Conference on Dependable, Autonomic and Secure Computing, Dec. 12, 2011, pp. 1110-1116, IEEE.
Beltrán-Escavy, J., "Development of a Control System for Multiple Mobile Robots Using a Graphic User Interface", University of Tokyo Dissertation, Nov. 1, 1998, pp. 1-191, University of Toyko.

* cited by examiner

METHODS AND ARRANGEMENTS FOR ROBOT DEVICE CONTROL IN A CLOUD

TECHNICAL FIELD

This disclosure relates to controlling of robot devices. In more particular, it relates to methods and Web servers for controlling robot devices in a cloud.

BACKGROUND

Moving robotics and automation algorithms into the cloud requires frameworks that facilitate this transition. The cloud provides three possible levels at which a framework could be implemented. The lowest level is Infrastructure as a Service (IaaS), where bare operating systems are provided on machines, which can be virtualized, in the cloud. The second level, Platform as a Service (PaaS), provides more structure, including application frameworks and database access, while restricting the choice of programming languages, system architectures, and database models, which can be used. Software as a Service (SaaS), the third level is the highest level of structure of which there is a demand these days.

The current focus of cloud based robotics is to either speed up the processing of input data collected from many sensors with big data computation, or to collect various knowledge bases in centralized locations e.g., possible grasping poses of various three-dimensional (3D) objects.

There are commercially available cloud-based software platforms that leverage leading cloud, Web, and mobile technologies. Such platforms can allow customers to access and analyse their robots' data on without restriction to location and/or time.

Another aspect of cloud robotics relates to the way how a robot related functionality is moved into cloud. One way is to run an original robot specific task in the cloud without any significant change. Examples of such alternatives are to run an original robot specific task in a virtual machine (VM), in a container or in a virtualized programmable logic controller (PLC).

Another way is to update/modify/rewrite the code of robot related tasks to utilize existing services or application programming interfaces (APIs) of the cloud.

A third way is to extend the cloud platform itself with new features that make robot control more efficient. Such new robot-aware cloud features can be explicitly used by robot related tasks, i.e. new robot-aware services/APIs offered by the cloud, or can be transparent solutions, for example improving the service provided by the cloud to meet requirements of the robot control.

Today cloud robotics exists mostly following the PaaS approach. However, with the help of $5^{th}$ generation wireless systems (5G), the PaaS approach may be extended to use the SaaS paradigm offering many potential advantages for robots and automation systems.

From U.S. Pat. No. 9,031,692 B2 it is known a cloud robot system and a method for integrating the same. In this document the cloud can be used to scale up complex calculation tasks, of which one refers to a robot relates task.

Patent document U.S. Pat. No. 8,798,791 B2 teaches a robot control system and a robot control method. This document relates to moving a robot control in the cloud to a point that is closest to the robot that the user wishes to control.

With SaaS, an interface allows data to be sent to a server that processes the data as input and returns output, which relieves users of the burden of maintaining data, software and hardware, and also allows companies to control proprietary software. This approach is called this Robotics and Automation as a Service (RAaaS).

There is however a demand for a more versatile robot service and control.

SUMMARY

It is an object of embodiments of the disclosure to address at least some of the issues outlined above, and this object and others are achieved by a first and a second Web server adapted to control a robot device, methods performed therein, and computer programs therefore.

According to one aspect, the disclosure provides a method for a first and a second Web server controlling a robot device across a Web interface in a cloud. The method comprises sending, by the first Web server, towards the second Web server located in a remote cloud location, a hypertext transfer protocol request for one or more trajectories between a first position and a second position for the robot device. The hypertext transfer protocol request comprises encoded in unified resource location a workspace of the robot device and a configuration of the robot device. The method also comprises obtaining one or more calculated trajectories for the robot device between the first position and a positon that is closer to the second position than the first position, based on the workspace and the configuration of the robot device. Also, the method comprises sending, to the first Web server located in a local cloud location, a hypertext transfer protocol response to the hypertext transfer protocol request, wherein the hypertext transfer protocol response comprises said one or more calculated trajectories. In addition, the method comprises executing, by the first Web server, a trajectory being at least based on said one or more calculated trajectories for the robot device.

According to another aspect, the disclosure provides a method for a first Web server controlling a robot device across a Web interface in a cloud. This method comprises sending across the Web interface, towards a second Web server located in a remote cloud location, a hyper-text transfer protocol request for one or more trajectories between a first position and a second position for the robot device. The hyper-text transfer protocol request comprises encoded in unified resource location a workspace of the robot device and a configuration of the robot device. The method also comprises receiving a hyper-text transfer protocol response to the hyper-text transfer protocol request, wherein the hyper-text transfer protocol response comprises said one or more calculated trajectories. In addition, the method comprises executing a trajectory that is at least based on said one or more calculated trajectories for the robot device.

According to yet another aspect, the disclosure provides a method for a second Web server controlling a robot device across a Web interface in a cloud. This method comprise receiving, from a first Web server, a hyper-text transfer protocol request for one or more trajectories between a first position and a second position for the robot device, wherein the hyper-text transfer protocol request comprises encoded in unified resource location, a workspace of the robot device and a configuration of the robot device. The method also comprises obtaining one or more calculated trajectories for the robot device between the first position and a positon that is closer to the second position than the first position, based on the workspace and the configuration of the robot device. In addition, the method comprises sending across the Web interface to said first Web server located at a local cloud location, a hyper-text transfer protocol response being a response to the hyper-text transfer protocol request, wherein the hyper-text transfer protocol response comprises said one or more calculated trajectories.

According to yet another aspect, the disclosure provides a computer program for robot device control comprising instructions which, when executed on at least one processor, cause the at least one processors to carry out the method according to aspects as described above.

According to yet another aspect, the disclosure provides a computer-readable storage medium, having thereon said computer program.

According to still yet another aspect, the disclosure provides a first Web server that is adapted to control a robot device over a Web interface in a cloud. The first Web server comprises a processor circuit and a memory having instructions executable by the processor circuit, wherein said processor circuit when executing the instructions is configured to send, across the Web interface, towards a second Web server located in a remote cloud location, a hyper-text transfer protocol request for one or more trajectories between a first position and a second position for the robot device. The hyper-text transfer protocol request comprises encoded in unified resource location a workspace of the robot device and a configuration of the robot device. When executing the instructions the processor circuit is configured to receive a hyper-text transfer protocol response to the hyper-text transfer protocol request, wherein the hyper-text transfer protocol response comprises said one or more calculated trajectories.

In addition, when executing the instructions the processor circuit is configured to execute a trajectory that is at least based on said one or more calculated trajectories for the robot device.

According to still yet another aspect, the disclosure provides a second Web server that is adapted to control a robot device over a Web interface in a cloud. The second Web server comprises a processor circuit and a memory having instructions executable by the processor circuit, wherein said processor circuit when executing the instructions is configured to receive, from a first Web server, a hyper-text transfer protocol request for one or more trajectories between a first position and a second position for the robot device, wherein the hyper-text transfer protocol request comprises encoded in unified resource location, a workspace of the robot device and a configuration of the robot device.

When executing the instructions the processor circuit is configured to obtain one or more calculated trajectories for the robot device between the first position and a positon that is closer to the second position than the first position, based on the workspace and the configuration of the robot device. In addition, when executing the instructions the processor circuit is configured to send across the Web interface towards said first Web server located in a local cloud location, a hyper-text transfer protocol response being a response to the hyper-text transfer protocol request, wherein the hyper-text transfer protocol response comprises said one or more calculated trajectories.

Embodiments of the present disclosure comprise the following advantages:

An advantage of embodiments of the present disclosure is that the Web service architecture, being currently available, can be used without any modification or alternation for the control of multiple robot devices. The usage of storages, such as caches, is beneficial for the scaling of the control of robots or robot devices.

Another advantage of the disclosure is that embodiments are scalable as parallel calculation of trajectories can be performed.

Storable trajectories reduce calculation need and calculation latency.

As calculation and execution of trajectories are operable in different cloud systems and work in different time scales, embodiments of the disclosure allow complex scalable control mechanism from large distances.

BRIEF DESCRIPTION OF THE DRAWINGS

Embodiments will now be described in more detail, and with reference to the accompanying drawings, in which.

DETAILED DESCRIPTION

In the following description, different embodiments of the disclosure will be described in more detail, with reference to accompanying drawings. For the purpose of explanation and not limitation, specific details are set forth, such as particular examples and techniques in order to provide a thorough understanding.

Although robotic service has been exposed as a Web service by others, the focus has been on monitoring tasks. Little of the benefits of existing Web services are thus exploited.

It has been found that existing trajectory or path generation methods in cloud robot control do not use Web services. Also these existing methods do not utilize Web-storing mechanisms, such as caching.

There is thus a demand for a more versatile robot service and control.

The proposed embodiments of the present disclosure solution are based on and utilize a currently existing Web service infrastructure to provide scalable robot control from the cloud. Herein, trajectory execution and calculation methods are proposed, which methods are cloud-aware.

The herein proposed trajectory planning or calculation methods may use quantized start and goal positions. These positions allow efficient storage, such as caching, of trajectories to support concatenation of stored trajectories during searching for fitting trajectories, using a certain first tolerance.

The methods as herein proposed according to various embodiments, allow immediate start of robot device movement, even in the case of partially fitting trajectories.

Further, optimization methods, when used, ensure predefined precision and response time.

The operation of the proposed methods allows efficient use of various storing mechanisms, for example caching mechanisms of content delivery network (CDN).

In order to control a robot device, information about how to control the robot device is desirable. Controlling the robot device refers to controlling the motion of the robot device. This does not only include which local positions to visit, but also when to reach these local positions and also a speed with which the robot device is moving between any two positions. This speed may be dynamic and may hence vary along each trajectory.

A number of robot devices may be operated simultaneously within a small area, for instance on one or more objects. These objects may further also be moving. This implies that the motion of each robot device may have to be defined considering the motion of other robot devices and objects.

Control of a robot device may thus be accomplished by controlling the motion of the robot device. This can the performed by defining a trajectory along which the robot device will have to travel, in order not to risk colliding with other robot devices or moving objects, or even static installations.

Figure 1:
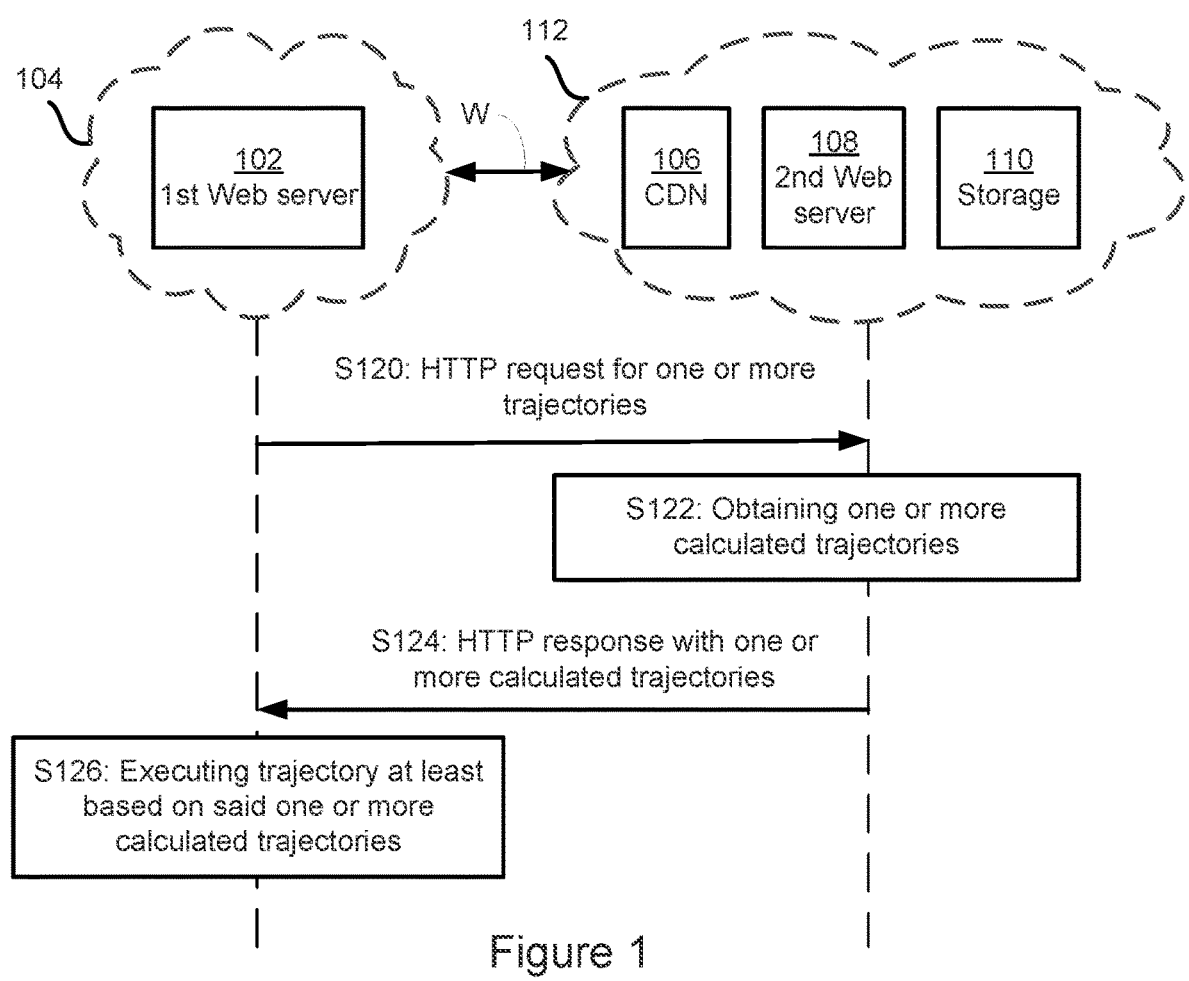
FIG. 1 illustrates a basic handshake diagram, according to embodiments of the present disclosure.

FIG. 1 illustrates a basic handshake diagram, according to embodiments of the present disclosure. The handshake diagram comprises communication between a local cloud location 104 and a separate cloud location 112. This separate cloud location may be located in a different cloud, relative to the local cloud location. Alternatively, the separate cloud location may be located within the same cloud as the local cloud location, but at a position that is different from the local cloud location. Moreover the separate cloud location may also comprise a remote cloud location that is remote in relation to the local cloud location.

Within the local cloud location 104, a first Web server 102 resides.

Within the separate cloud location 112, a content delivery network (CDN) 106 resides. Moreover, the separate cloud location 112 comprises a second Web server 108 and a storage 110.

It is noted that the Web interface W is defined as an interface between the local cloud location 104 and the separate cloud location 112.

The following actions are also performed:

Action S120: A hyper-text transfer protocol (HTTP) request for one or more trajectories is sent by the first Web server 102 towards the second Web server 108. The requested trajectories are trajectories between a first position and a second position, for a robot device, enabling robot device control. The HTTP request comprises encoded in uniform resource locator (URL) a workspace of the robot device and a configuration of the robot device. This information being encoded typically defines the space of motion of the robot device, and the design and parameters of the robot device.

Action S122: This action comprises obtaining one or more calculated trajectories for the robot device between the first position and a positon that is closer to the second position than the first position, based on the workspace and the configuration of the robot device.

These one or more calculated trajectories may be received by the second Web server, as a response to a call for calculation of said one or more trajectories between the first position and the second position, based on the workspace and the configuration of the robot device.

Alternatively, said one or more calculated trajectories may be retrieved from the storage 110, located at the remote cloud location of the separate cloud location 112.

Alternatively, said one or more calculated trajectories may be retrieved from a HTTP cache located in the CDN 106, of the separate cloud location 112.

Action S124: In response to the HTTP request for said one or more trajectories between the first and the second position, for the robot device, a HTTP response comprising said one or more calculated trajectories between the first position and a positon that is closer to the second position than the first position.

Action S126: The Web server 102 within the local cloud location executes a trajectory that is at least based on said one or more calculated trajectories.

In relation to the handshake diagrams of FIGS. 2A and 2B, examples of application of embodiments of the present disclosure will now be described.

Figure 2A:
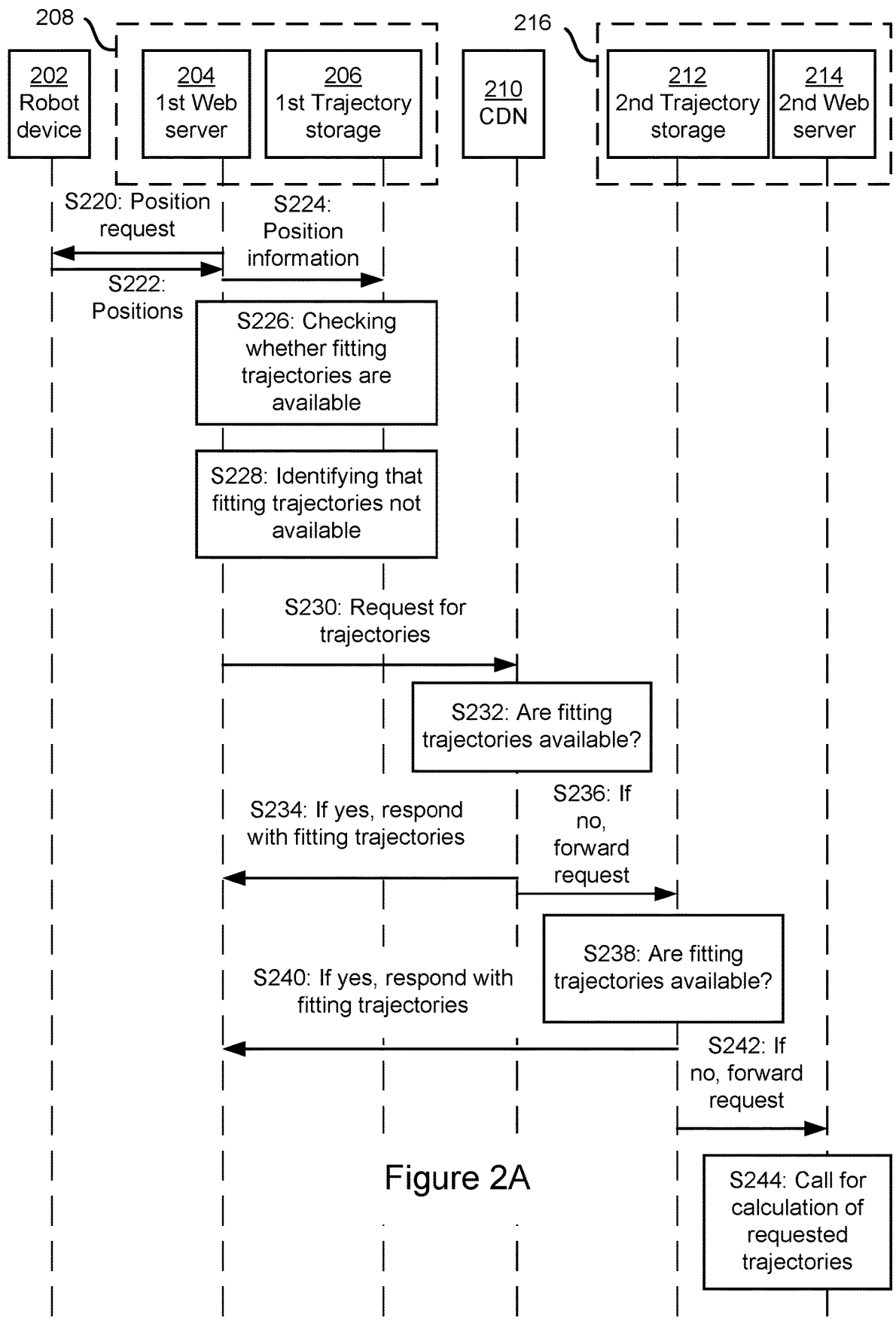
FIGS. 2A and 2B present handshake diagrams of an application example of embodiments of the present disclosure.
Figure 2B:
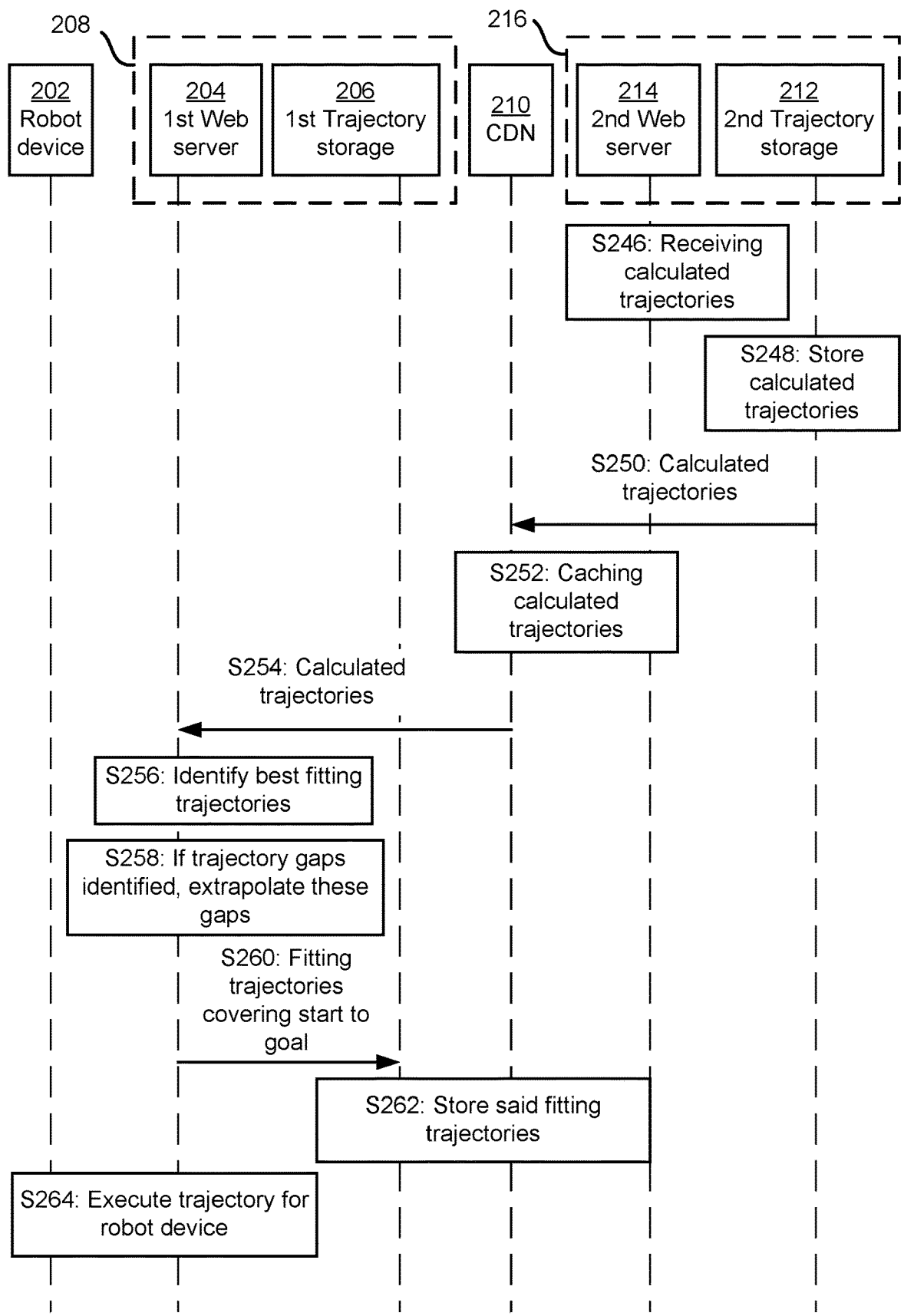

The handshake diagram of FIG. 2A comprises a robot device 202, a first Web server 204, a first trajectory storage 206, a CDN 210, a second trajectory storage 212, and a second Web server 214.

The first Web server 204 and the first trajectory storage 206 are located at a local cloud location 208, whereas the second trajectory storage 212 and the second Web server 214 are located at a remote cloud location 216.

It is noted that the second trajectory storage 212 corresponds to the storage 110 as illustrated in FIG. 1.

The first Web server 204 and the second Web server 214 are located in different cloud locations, or even in different clouds, which locations and/or clouds can be separated in space, allowing trajectory planning/calculation and trajectory execution separated by a significant distance.

The Web interface is the interface between the local cloud location 208, on the one side, and the CDN 210 and the remote cloud location, on the other side.

The function of the handshake diagram may be regarded as a Web service that can be offered to users wishing to control robot devices in a cloud environment. The Web service can be performed stateless in a representation state transfer-full (RESTful) way. A request for one or more trajectories may thus be served by a trajectory planning Web service. In the case of a high load, the Web service can be scaled up easily thanks to a stateless property of retrieving or calculating a trajectory.

By using storage functionalities in the separate cloud location, already requested and obtained trajectories do not have to recalculated as these are already stored in either the second trajectory storage 212 or in a cache in the CDN 210, and may hence be identified in a short time, with which a request can be served without further loading the second Web server 214.

It is herein proposed a way to execute a robot device movement command by the first Web server 204 supported by the second Web server 214. This first Web server 204 may be regarded to comprise a cloud-aware trajectory execution function, and the second Web server may be regarded to comprise a trajectory planning function, within the Web service.

Controlling the motion of a robot device comprises controlling between which positions a robot device is to be moved, which path to be moved along and with which local speed.

When having information between which positions a robot device is to be translated and/or rotated, a function within the local cloud location, herein residing in a the first Web server 204, performs a check in a first trajectory storage 206 for trajectories or trajectory segments with which the requested trajectories can be covered. First and second positions are typically start and goal/end positions, between which a robot device is to be moved.

The check for a fitting trajectory typically accepts a non-exact, however close enough, match between requested first and second positions of the requested trajectory and the respective positions of a retrieved trajectory stored in the first trajectory storage 206. Any potential discrepancy between positions from requested trajectories and retrieved trajectories, is identified. The distance of the potential discrepancies may be calculated in Cartesian coordinates or in joint space. In the event this discrepancy is small enough, the corresponding gap may be covered by extrapolation of existing trajectories.

If no matching trajectories can be found in the first trajectory storage 206, the first Web server sends a request for at least one trajectory towards the second Web server 214. This request may be responded to by one or more calculated trajectories matching the request.

Based on this calculated trajectory, the robot device may subsequently be controlled by execution of a trajectory by the first Web server 204, which trajectory being executed being at least based on or dependent on the calculated trajectory.

Down below a more detailed description of the application example of embodiments herein is provided.

Action S220: A request can be sent to the robot device 202 for acquiring current robot poses, the current work space of the robot device as well as the robot device configuration.

Action S222: The acquired current robot poses may be provided from the robot device 202 to first Web server 204.

Action S224: The acquired information about robot device poses etc., may here be provided to the first Trajectory storage 206.

Action S226: This action comprises checking whether fitting trajectories are available. The first Web server 204 performs a check for fitting trajectories located in the first trajectory storage 206. For this purpose a tolerance during fitting may be used, such that a first or starting position of a fitting trajectory is allowed to be at most spaced a tolerance distance from the first position of a requested trajectory. In the event that two or more trajectories are fitting the request, the shortest of the two or more fitting trajectories is preferably chosen, for execution.

Within this action extrapolation can also be performed. For example, assume that the requested or desired trajectory defines a path between a first position A, and a second position B, i.e. A→B, wherein A and B thus denote respective start/goal pose, in a space, such as Cartesian space. A tolerance of 5 mm may further be used. Assume further that a search within the first trajectory storage 206 for fitting trajectories between the A position and the B position reveals the following: A first trajectory between position A and position C, i.e. A→C, a second trajectory between C and D, i.e. C→D, a third trajectory between position D* and E, i.e. D*→E, and a fourth trajectory between positions E and B*, i.e. E→B*. It is noticed that there is a first gap between D and D*, and a second gap between B and B*. If, however, the distance between D and D* and between B and B* are both less than 5 mm, then the A→C→D→D*→E→B*→B path can be used and together form a fitting trajectory. It is note that the gaps, or missing trajectory segments, i.e. D→D* and B*→B*, are here successfully extrapolated.

Action S228: This action is triggered if fitting trajectories cannot be identified in the first trajectory storage 206. The event that identifying that fitting trajectories are not available is triggered, if either no trajectory at all, is found, or only partially fitting trajectories are identified or found in the search in the first trajectory storage 206.

It should be clarified that a partially fitting trajectory may be a trajectory having a start and a goal position of which one fits with the start and the goal of the requested trajectory. Also the distance between the goal of the partially fitting trajectory and the goal of the requested trajectory, is shorter than the distance between the distance between the start and the goal of the requested trajectory. Thus the remaining distance to be bridged is reduced.

Within one embodiment it is proposed to apply a partially fitting trajectory, rather than sending a request for the entire distance A to B, if the remaining trajectory planning is estimated to take a shorter time than execution of the partially fitting trajectory to reach the gap.

For instance: Assume that the desired or requested trajectory is A→B and the distance between A and B is 1000 mm. Also, assume that the first trajectory storage 206 comprises the partially fitting A→G trajectory where the distance between G and B is only 150 mm. Assume that the trajectory planning to obtain a trajectory between G and B, takes 1500 ms in worst case. If the robot needs more than 1500 ms for moving through A→G trajectory, then this A→G trajectory can be used as partially fitting trajectory. In short, if planning for a trajectory covering a gap defined by the partially fitting trajectory, takes a shorter time than executing the partially fitting trajectory, it is proposed within this embodiment to use the partially fitting trajectory.

Action S230: In this case, i.e. if action S228 is fulfilled, as indicated above, a request for one or more trajectories is sent. This request is a request for the desired trajectory. The request also comprises the workspace for the robot device as well as robot configuration information concerning a cache storage in the content delivery network (CDN) 210.

The first and second positions, being start and goal positions of the desired and requested trajectory may be encoded and placed in a custom HTTP header field of the HTTP request. In addition, quantized start and goal positions, or poses, may also be encoded and placed in an URL field of the HTTP request header. Quantizing may be performed in Cartesian space or in joint space. Also, workspace and robot configuration information for the robot device may be encoded in an URL field of the HTTP request.

An example of a HTTP header with encoded information is:
GET/rest/Webserver214?qStartPosition=0.1,0.3,0.4,0,0, 3.14&qEndPosition=0.5,0.5,0.5,0,0,0
HTTP/1.1&workspaceHash=asadfewfcd&robot=UR5-default
Host: cloud.robotics.company.com
BaseTrajectory:
startPosition=0.123,0.344312,0.41,0,0,3.14564&endPosition=0.52,0.532,0.52,0.001,0,0
. . . .

Action S232: Within the cache in CDN 210, it is checked whether one or more fitting trajectories are available, or not, in the HTTP cache. It is noted that trajectories stored in the HTTP cache are trajectories which were previously calculated and stored in the HTTP cache.

Action S234: If there are fitting trajectories available in the HTTP cache in the CDN 210, these, or at least the shortest of said, trajectories may be sent to the first Web serve 204, in a HTTP response to the HTTP request.

Action: S236: If no fitting trajectory can be identified in the HTTP cache located in CDN 210, the HTTP request, as sent in S230, is forwarded. The HTTP request may here be forwarded to either the second trajectory storage 212 or to the second Web server 214. If it is forward to the second Web server 214, it can also be shared with the second trajectory storage 212.

Action S238: It is now checked whether the second trajectory storage 212 has trajectories which fit the request for trajectories between a given start position and a given end or goal position, within the workspace and the configuration of the robot device. The check as performed in this second trajectory storage 212 is a check for exactly fitting trajectories, in the sense within the tolerances of the trajectories, as mentioned before. Partially fitting trajectories are herein not accepted.

Action S240: If fitting trajectories are identified in the second trajectory, these are encoded in URL and sent encoded within a HTTP response towards the first Web server 204.

It is noted that the HTTP response may be sent via the HTTP cache in the CDN 210, in order to enable the HTTP cache to store the fitting trajectories, and to forward said HTTP response to the first Web server 204.

Action S242: If, however, no fitting trajectories are identified in the second trajectory storage 212, the request for trajectories is forwarded to the second Web server 214.

Action S244: As no fitting trajectories were identified in either the HTTP cache of CDN 210 or in the second trajectory storage 212, the second Web server 214 has a task to identify fitting trajectories. This task may be solved by calling a calculation function, which may be external to the second Web server 214. This call is for calculating one or more trajectories according to the request for trajectories. The trajectories as here being called shall of course match criteria concerning start and goal positions of the requested trajectories, i.e. first and second positions. Also, the trajectories defining a path shall be located within the workspace of the robot device and the given configuration of the robot device.

The call for calculation may preferably comprise a call for trajectories, of which one is a trajectory having quantized start and goal positions, and one having the original, i.e. non-quantized, start and goal positions. Trajectories with quantized start and goal positions can be useful and may fit within tolerances with several requested trajectories. One reason for this may be that local positioning of robot device near start and/or goal ends of trajectories typically vary, whereas several trajectories may show the same or at least similar behaviour, or path, along significant segments of the trajectories, distanced from said start and goal positions.

Action S246: As a response to the call for calculated trajectories, the second Web server 214 receives calculated one or more trajectories from the call function. These received trajectories are encoded and placed into a response body to be sent towards the local cloud location 208. The second Web server 214 also sends said one or more calculated trajectories to the second trajectory storage 212.

Action S248: The second trajectory storage 212 stores the calculated trajectories, as received from the second Web server 214.

Also, the second trajectory storage 212 may also identify additional trajectories, similar to the ones as received from the second Web server 214. The additional trajectories may have first and second positions, i.e. the start and goal positions, of the trajectories, within a certain second tolerance from the positions of the calculated trajectories. The additional trajectories shall preferably fulfil the fitting criteria of the requested trajectories, i.e. that the start and goal of the additional trajectories are within the first tolerance from the first and second positions of the requested trajectories. This is preferable, since a larger number of fitting trajectories can be provided, from which a trajectory to be executed by the first Web server 204, may be chosen later on.

Action S250: The calculated trajectories that fit the requested trajectory, possibly also including said additional trajectories, are sent from the second trajectory storage 212 to the CDN 210, comprising the HTTP cache.

The present disclosure also comprises a trajectory optimization function. This optimization function may comprise means to query the HTTP cache in the CDN 210 about its hit rate, i.e. the rate with which fitting trajectories are identified in the HTTP cache, in action S232.

Also, the second trajectory storage 212 is queried about its hit rate. Trajectories which are identified as providing a hit, and hence in this respect are popular, may be optimized by, for instance, making these trajectories shorter, smoother and/or even faster, in the sense taking less time.

It is noted that trajectories are associated with a certain age. Typically optimized trajectories are given a higher maximum age value, than non-optimized trajectories. One example of a maximum age value is 5 minutes.

Trajectories having an age that has passed the maximum age value will typically be removed from its stored location.

Optimized trajectories may be stored in the second trajectory storage 212.

Action S252: The HTTP cache in the CDN 210 caches trajectories that are received from the second trajectory storage 212, possibly optimized by the optimization function.

Action S254: The HTTP cache in the CDN 210 forwards the calculated trajectories to the first Web server 204.

Action S256: After the first Web server 204 has received calculated trajectories, the first Web server may identify the trajectories which best fit the criteria of the requested trajectories, i.e. which calculated trajectories whose first and second positions best fit the start and second positions of the requested trajectories.

Action S258: In the event that the best fitting trajectories dot not fully comprise the entire trajectories of the requested trajectories, i.e. that the calculated trajectories have one or more gaps, extrapolation is applied to cover, or bridge, said one or more gaps. As indicated earlier, gaps, equal to, or shorter than, the first tolerance value, may be bridged by extrapolation herein.

It is noted that extrapolation may be performed in Cartesian space or in joint space, or alternatively in any other suitable sub-space for that matter.

These sub-spaces may span varying degrees of freedom. A sub-space having a single, i.e. one, degree of freedom can be illustrated by a stick. A sub-space having two degrees of freedom may be illustrated with a rotatable stick. Sub-spaces having three to four degrees of freedom are, for instance, robot arms in school examples. Sub-spaces having five degrees of freedom are unusual. A sub-space having six degrees of freedom may, for instance, is illustrated with an all-purpose robotic arm having three translational and three rotational degrees of freedom. Even higher degrees of freedom may be useful to avoid self-collision, but tend to be challenging to calculate.

For the extrapolation, linear methods are typically applied. Other extrapolation methods, such as non-linear methods, may however alternatively be applied.

One or more trajectories covering the entire path of the trajectory from the first position to the second position, i.e. from start to goal, are here achieved.

Action S260: The first Web server 204 sends these fitting trajectories covering the entire path of the trajectory from the first position to the second position, i.e. from start to goal, to the first trajectory storage 206.

Action S262: The first trajectory storage 206 stores the received trajectories which well fit the requested trajectories.

Action S264: The Web server 204 finally executes a trajectory for the robot device to control the robot device in respect of the motion and/or movements of the robot device.

The trajectory being executed may thus at least be based on one or more trajectories as received in action S254.

It is noted that the first Web server 204 and the second Web server may operate in different time scales. The functions within the First Web server 204 allow direct control within 1 ms, whereas calculation of new trajectory may take several 100 ms. It is noted that retrieving a calculated trajectory from the HTTP cache of the CDN 210 may take the order of 10 ms.

Similar to the optimization function as described above in connection with the second trajectory storage 212, the first trajectory storage 206 may also be have connected to an optimization function.

Optimization of trajectories in these functions may comprise shortening or smoothening of said trajectories. For this purpose, advanced planning methods are proposed. These methods are typically too resource intensive, for instance demanding too much processing or calculation capacity, in order to be comprised in the above described trajectory request-response loop.

For this reason, the optimization may be initiated within the loop, but actually performed outside the loop, however within the infrastructure used herein.

Each optimization function may optimize all trajectories present in respective storage or only a subset of them. The selection of which trajectories to optimize may be based on cache hit rates and a measure of how optimal each trajectory is for a trajectory request.

Each optimization function may further mark each optimized trajectory with a value that describes a degree of optimality. This value may be checked prior to any further optimization. In the case a trajectory would already have associated a significantly high optimization value; further optimization will not be conducted, at that point in time.

Each function may set a maximum age value for a trajectory as a function of the optimality of said trajectory. A higher optimality value would typically result in a higher maximum age value. A lower optimality value would accordingly result in a lower maximum age value.

Information may be deduced from the load of the items within the present disclosure, based on cache and/or storage hits, to be provided to analytics, allowing optimization of trajectories based on said analytics.

The trajectory planning Web service and/or trajectory optimization methods may set maximum age value of a HTTP response depending on the optimality of the planned/optimized trajectory. By setting a maximum age value, the trajectories stored in the HTTP cache in the CDN 210 and in the second trajectory storage 212, can become increasingly optimal as well as increasingly independent of calculation of further trajectories.

Trajectory optimization function may continuously optimize the trajectories in a closed loop by using Key Performance Indicators (KPIs), which characterize end-to-end (E2E) precision, response time and the effectiveness of the Web service.

For optimization, the following key performance indicators may henceforth be used:

E2E KPIs
- Precision: Distance between the start/goal position of a requested trajectory and respective position of a calculated trajectory.
- Response time to achieve the requested position with a trajectory.

KPIs characterizing the associated Web service efficiency of these actions.

- Existing trajectory request response time: Tim between requesting and receiving a trajectory from a storage, such as a cache.
- New trajectory request response time: time between requesting and receiving a new trajectory from the second Web server 214.
- Cache (storage) hit rate: The percent of requests, the responses of which are available in the cache (storage).

Figure 3:
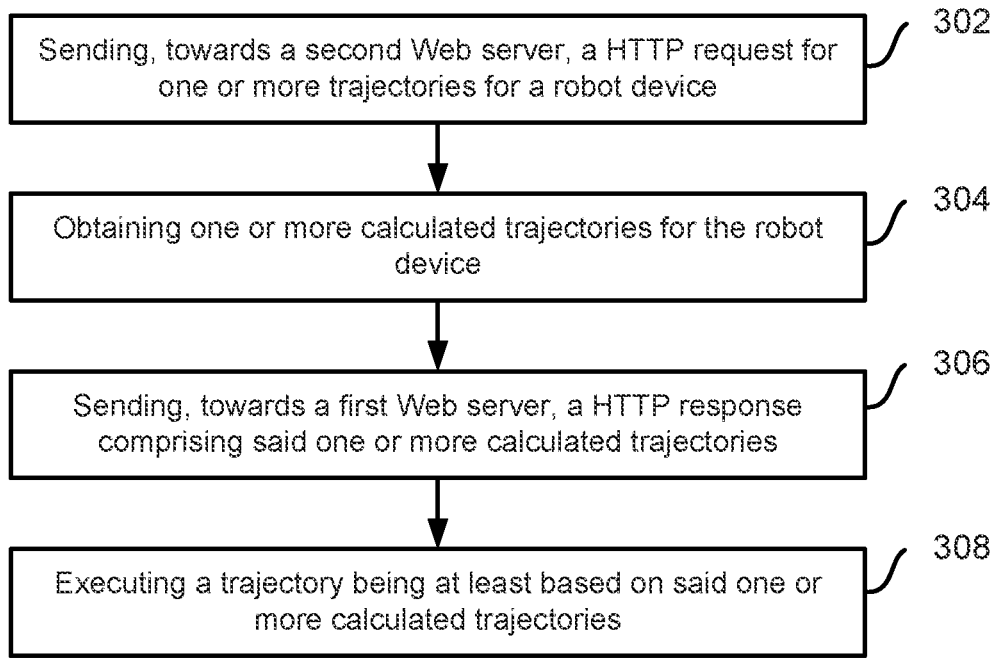
FIGS. 3, 4 and 5 present flow diagrams of actions of methods according to embodiments of this disclosure.

FIG. 3 presents a flow diagram of actions within a method in a first and a second Web server controlling a robot device across a Web interface in a cloud. The method comprises the following actions:

Action 302: Sending by the first Web server, towards the second Web server located in a remote cloud location, a HTTP request for one or more trajectories between a first position and a second position, for the robot device. The HTTP request comprises encoded in URL a workspace of the robot device and a configuration of the robot device.

Action 304: Obtaining one or more calculated trajectories for the robot device between the first position and a positon that is closer to the second position than the first position, based on the workspace and the configuration of the robot device:

Action 306: Sending, to the first Web server located in a local cloud location, a HTTP response to the HTTP request, wherein the HTTP response comprises said one or more calculated trajectories.

Action 308: Executing, by the first Web server, a trajectory being at least based on said one or more calculated trajectories for the robot device.

The one or more trajectories are thus trajectories of the robot device, and said one or more trajectories are trajectories from the first position to the second position.

There are a few ways in which calculated trajectories can be obtained.

According to some first embodiments of this disclosure, obtaining 304 comprises receiving said one or more calculated trajectories by the second Web server, as a response to a call for calculation of said one or more trajectories between the first position and the second position, based on the workspace and the configuration of the robot device. Following these first embodiments, the method may further comprise storing S250, S254 said one or more calculated trajectories in a storage at the remote cloud location. Moreover, within these first embodiments of the present disclosure, sending S124, 302 the HTTP response may comprise sending the HTTP response via a HTTP cache located in a content delivery network, CDN, and wherein the method further comprises storing said one or more calculated trajectories in the HTTP cache.

According to some second embodiments of this disclosure, obtaining 304 said one or more calculated trajectories, comprises retrieving one or more earlier calculated trajectories from a storage, where said one or more earlier calculated trajectories was calculated based on the workspace and the configuration of the robot device. Within said second embodiments, retrieving said one or more calculated trajectories may comprise retrieving said one or more calculated trajectories from a storage located at the remote cloud location. Further, within these second embodiments of the present disclosure, sending S124 the HTTP response may comprise sending the HTTP response via a HTTP cache located in a CDN, and wherein the method further comprises storing said one or more calculated trajectories in the HTTP cache.

According to some third embodiments of this disclosure, obtaining 304 said one or more calculated trajectories, comprises retrieving one or more earlier calculated trajectories from a storage, where said one or more earlier calculated trajectories was calculated based on the workspace and the configuration of the robot device.

Within these third embodiments of the present disclosure, sending S120 the HTTP request comprises sending the HTTP request via a HTTP cache located in a CDN, and wherein retrieving said one or more calculated trajectories from a storage comprises retrieving said one or more calculated trajectories from the HTTP cache located in the CDN.

Within these third embodiments of the present disclosure, sending S124 the HTTP response may comprise sending the HTTP response via the HTTP cache located in the CDN, and wherein the method further comprises storing said one or more calculated trajectories in the HTTP cache.

Within the method of the first, second or third embodiments, the first and the second positions may also comprise first and second quantized positions. Quantized positions herein refer to rounded positions. By quantizing first and second positions, positions close to the first and second positions, respectively, will be rounded to said first and second positions, respectively. By quantizing positions, storage memory required for storing first and second positions decreases, for which reason a reduced memory size can suffice.

Within any of the first, second and third embodiments, sending the HTTP request for trajectories between the first position and the second position, may comprise sending the HTTP request for trajectories between positions within a tolerance from said first and second positions.

The action of obtaining 304 said one or more trajectories for the robot device may also comprise obtaining precision information of said one or more calculated trajectories. This precision information may be provided in response to a requested tolerance or in response to a predefined tolerance. This precision information can be regarded to be a measure of how well the first position and the position that is closer to the second position than the first position, of a calculated trajectory, correspond the first position and the second position, of the requested trajectories.

The action of obtaining 304 said one or more calculated trajectories may be dependent on the obtained precision information and that the age of the calculated trajectories is smaller than a maximum age of said one or more calculated trajectories.

Further, the method may also comprise concatenating, by the first Web server, at least one of said one or more calculated trajectories and a trajectory already stored at the local cloud location. This may be performed to construct a longer or more detailed trajectory for the robot device.

In addition, the method in the first and the second Web server controlling the robot device may further comprise calculating, by the first Web server, a trajectory segment for covering one or more identified trajectory gaps between requested and calculated trajectories, by extrapolating, or interpolating, one or more calculated or already stored trajectories. Information of such gaps to be covered may be obtained from the precision information that may be regarded to be a measure of how well the first position and the position that is closer to the second position than the first position, of a calculated trajectory, corresponds the first position and the second position, of the requested trajectories.

Figure 4:
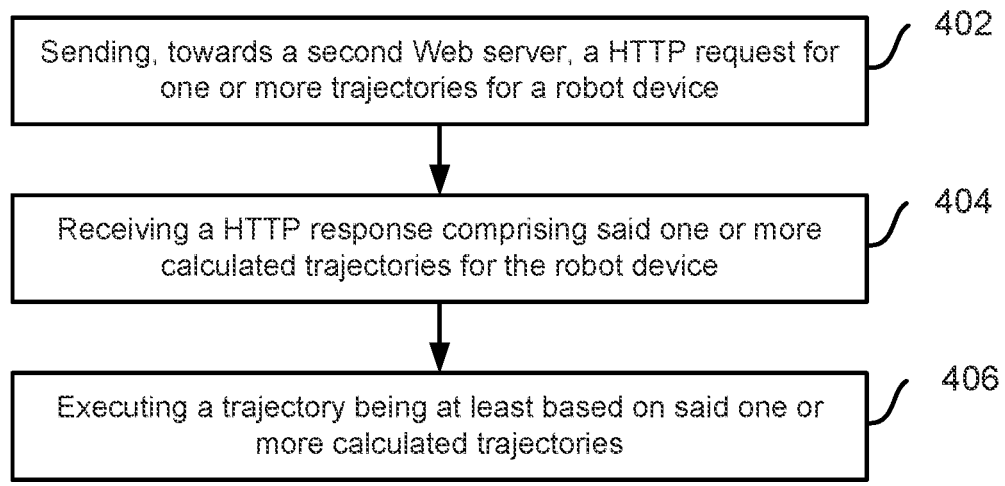

FIG. 4 presents a flow diagram of actions within a method in a first Web server controlling a robot device across a Web interface in a cloud. The method comprises the following actions:

Action 402: Sending, across the Web interface, towards a second Web server located in a remote cloud location, a HTTP request for one or more trajectories between a first position and a second position, for the robot device. The HTTP request comprises encoded in URL a workspace of the robot device and a configuration of the robot device.

Action 404: Receiving a HTTP response to the HTTP request, wherein the HTTP response comprises said one or more calculated trajectories.

Action 406: Executing a trajectory that is at least based on said one or more calculated trajectories for the robot device.

Figure 5:
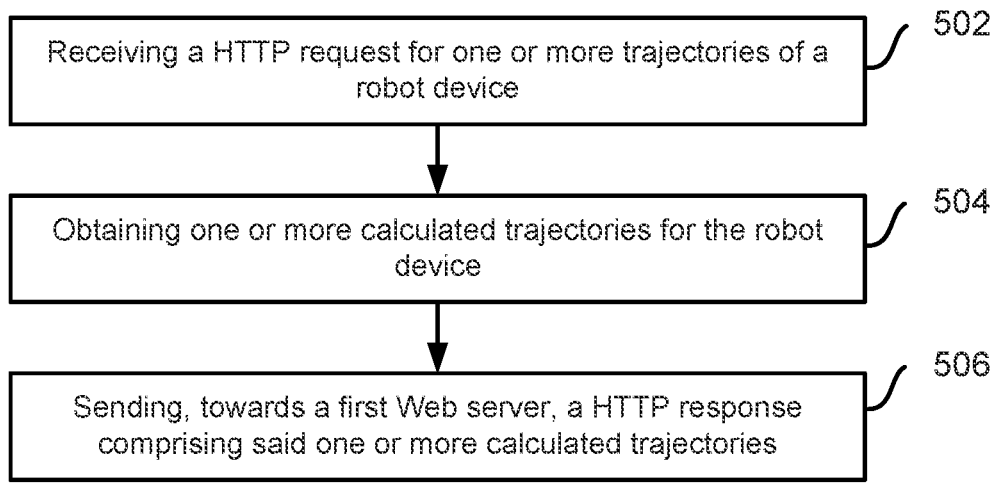

FIG. 5 presents a flow diagram of actions within a method in a second Web server controlling a robot device across a Web interface in a cloud. The method comprises the following actions:

Action 502: Receiving, from a first Web server, a HTTP request for one or more trajectories between a first position and a second position, for the robot device. The HTTP request comprises encoded in URL, a workspace of the robot device and a configuration of the robot device.

Action 504: The method also comprises obtaining one or more calculated trajectories for the robot device between the first position and a positon that is closer to the second position than the first position, based on the workspace and the configuration of the robot device.

Action 506: The method also comprises sending across the Web interface to said first Web server located at a local cloud location, a HTTP response being a response to the HTTP request, wherein the HTTP response comprises said one or more calculated trajectories.

The present disclosure also comprises a first computer program having instructions which, when executed on at least one processor of a first Web server controlling a robot device across a Web interface in a cloud, cause the at least one processor to send, across the Web interface, towards a second Web server located in a remote cloud location, a HTTP request for one or more trajectories between a first position and a second position, for the robot device. The HTTP request comprises encoded in URL a workspace of the robot device and a configuration of the robot device.

When the instructions are executed on the at least one processor, said instructions cause the at least one processor to receive a HTTP response to the HTTP request, wherein the HTTP response comprises said one or more calculated trajectories.

In addition, when the instructions are executed on the at least one processor, said instructions cause the at least one processor to execute a trajectory that is at least based on said one or more calculated trajectories for the robot device.

The present disclosure also comprises a second computer program having instructions which, when executed on at least one processor of a second Web server controlling a robot device across a Web interface in a cloud, cause the at least one processor to receive, from a first Web server, a HTTP request for one or more trajectories between a first position and a second position, for the robot device. The HTTP request comprises encoded in URL, a workspace of the robot device and a configuration of the robot device.

Further, when the instructions are executed on the at least one processor, said instructions cause the at least one processor to obtain one or more calculated trajectories for the robot device between the first position and a positon that is closer to the second position than the first position, based on the workspace and the configuration of the robot device.

In addition, when executing the instructions on the at least one processor, said instructions cause the at least one processor to send across the Web interface to said first Web server located at a local cloud location, a HTTP response being a response to the HTTP request, wherein the HTTP response comprises said one or more calculated trajectories.

The present disclosure also comprises a computer-readable storage medium having thereon the first and/or second computer program as above.

Figure 6:
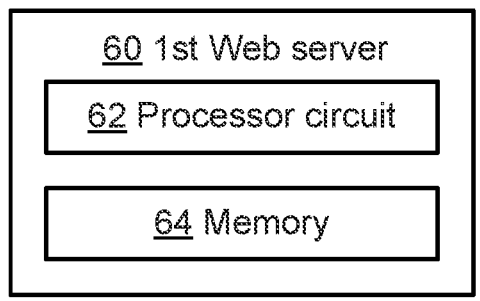
FIGS. 6 and 7 schematically present a first Web server according to embodiments of the present disclosure.

FIG. 6 schematically presents a first Web server 60 that is capable of controlling a robot device over a Web interface in a cloud. The first Web server comprises a processor circuit 62 and a memory 64 that has instructions which are executable by the processor circuit 62. When executing these instructions, the processing circuit is configured to send a HTTP request across the Web interface, towards a second Web server 80, 90 that is located in a remote cloud location. This HTTP request is a request for one or more trajectories between a first position and a second position, for the robot device. The HTTP request also comprises encoded in URL, a workspace of the robot device and a configuration of the robot device.

When executing these instructions, the processing circuit is configured to receive a HTTP response to the HTTP request, wherein the HTTP response comprises said one or more calculated trajectories.

In addition, when executing these instructions, the processing circuit is configured to execute a trajectory that is at least based on said one or more calculated trajectories for the robot device.

Figure 7:
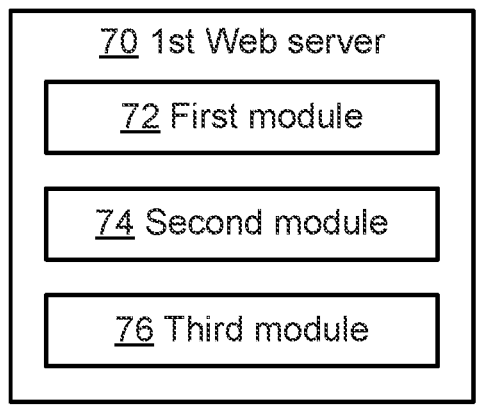

The present disclosure also comprises a first Web server 70 as schematically illustrated in FIG. 7. The first Web server 70 is adapted to control a robot device over a Web interface in a cloud. The first Web server 70 comprises a first module 72, a second module 74 and a third module 76. The first module 72 is adapted to send a HTTP request across the Web interface, towards a second Web server 80, 90 that is located in a remote cloud location. The HTTP request is a request for one or more trajectories between a first position and a second position, for the robot device. The HTTP request also comprises encoded in URL, a workspace of the robot device and a configuration of the robot device.

The second module 74 of the first Web server 70 is adapted to receive a HTTP response to the HTTP request, wherein the HTTP response comprises said one or more calculated trajectories.

In addition, the third module 76 is adapted to execute a trajectory that is at least based on said one or more calculated trajectories for the robot device.

The first Web server 60 and/or the first Web server 70 may comprise a HTTP server.

Figure 8:
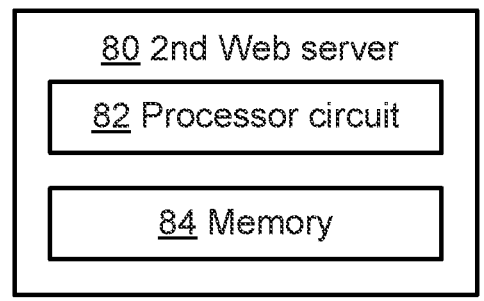
FIGS. 8 and 9 schematically present a second Web server according to embodiments of the present disclosure.

FIG. 8 schematically presents a second Web server 80 that is capable of controlling a robot device over a Web interface in a cloud. The second Web server 80 comprises a processor circuit 82 and a memory 84 that has instructions which are executable by the processor circuit 82. When executing these instructions, the processing circuit is configured to receive, from a first Web server 60, 70, a HTTP request for one or more trajectories between a first position and a second position, for the robot device. The HTTP request comprises encoded in URL a workspace of the robot device and a configuration of the robot device.

When executing these instructions, the processing circuit 82 is configured to obtain one or more calculated trajectories for the robot device between the first position and a positon that is closer to the second position than the first position, based on the workspace and the configuration of the robot device.

In addition, when executing these instructions, the processing circuit is configured to send across the Web interface towards said first Web server 60, 70 located in a local cloud location, a HTTP response being a response to the HTTP request. This HTTP response comprises said one or more calculated trajectories.

Figure 9:
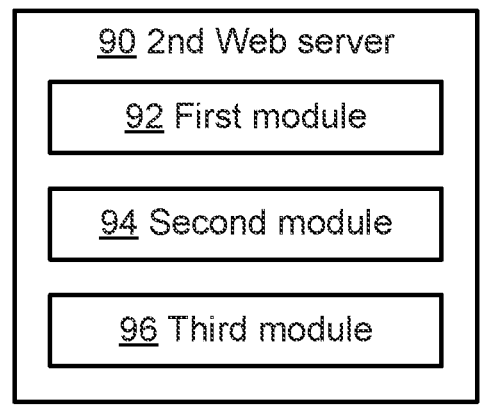

Also, FIG. 9 illustrates a second Web server. This second Web server 90 comprises a first module 92, a second module 94 and a third module 96.

The first module 92 is adapted to receive, from a first Web server 60, 70, a HTTP request for one or more trajectories between a first position and a second position, for the robot device. The HTTP request comprises encoded in URL a workspace of the robot device and a configuration of the robot device.

The second module 94 is adapted to obtain one or more calculated trajectories for the robot device between the first position and a positon that is closer to the second position than the first position, based on the workspace and the configuration of the robot device.

In addition, the third module 96 is adapted to send across the Web interface towards said first Web server 60, 70 located in a local cloud location, a HTTP response being a response to the HTTP request. This HTTP response comprises said one or more calculated trajectories.

The second Web server 80 and/or the second Web server 90 may comprise a HTTP server.

The term robot device as used through-out is to be construed broadly. A robot device may comprise a robot, a robot arm, or a robot grip.

Examples and/or embodiments of the present disclosure carry one or more of the following advantages:

The proposed Web service architecture being currently available can be used without any modification or alternation for the control of multiple robot devices. The usage of storages, such as caches, is beneficial for the scaling of the control of robots.

Embodiments are scalable as parallel calculation of trajectories can be performed.

Storable trajectories reduce calculation need and calculation latency.

As calculation and execution of trajectories are operable in different cloud systems and work in different time scales, embodiments of the disclosure allow complex scalable control mechanism from large distances.

ABBREVIATIONS 5G 5$^{th}$ generation wireless systems
API application programming interface
CDN content delivery network
DNS domain name server
HTTP hyper-text transfer protocol
IaaS infrastructure as a service
KPI key performance indicator
PaaS platform as a service
PLC programmable logic controller
RAaaS robotics and automation as a service
SaaS software as a service
URL uniform resource locator
VM virtual machine

The invention claimed is:

1. A method for a first Web server and a second Web server controlling a robot device across a Web interface in a cloud, the method comprising:
sending, by the first Web server and towards the second Web server located in a remote cloud location, a hypertext transfer protocol (HTTP) request for one or more trajectories between a first position and a second position for the robot device, wherein the HTTP request comprises a workspace of the robot device and a configuration of the robot device encoded in unified resource location (URL);
obtaining one or more calculated trajectories for the robot device between the first position and a position that is closer to the second position than the first position, based on the workspace and the configuration of the robot device, wherein the obtaining the one or more calculated trajectories for the robot device comprises:
obtaining precision information of the one or more calculated trajectories, wherein the precision information is provided in response to a requested or a predefined tolerance, and wherein obtaining the one or more calculated trajectories is dependent on the obtained precision information and that the age of the calculated trajectories is smaller than a maximum age of the one or more calculated trajectories; and
receiving, by the second Web server, the one or more calculated trajectories as a response to a call for calculation of the one or more trajectories between the first position and the second position, based on the workspace and the configuration of the robot device;
sending, to the first Web server located in a local cloud location, a HTTP response to the HTTP request, wherein the HTTP response comprises the one or more calculated trajectories, wherein the sending the HTTP response comprises sending the HTTP response via a HTTP cache located in a content delivery network (CDN);
storing the one or more calculated trajectories in the HTTP cache; and
executing, by the first Web server, a trajectory being at least based on the one or more calculated trajectories for the robot device.

2. The method of claim 1, wherein the obtaining the one or more calculated trajectories comprises retrieving one or more earlier calculated trajectories from a storage, where the one or more earlier calculated trajectories were calculated based on the workspace and the configuration of the robot device.

3. The method of claim 2, wherein the retrieving the one or more calculated trajectories comprises retrieving the one or more calculated trajectories from a storage located at the remote cloud location.

4. The method of claim 2:
wherein the sending the HTTP request comprises sending the HTTP request via the HTTP cache located in the CDN; and
wherein the retrieving the one or more calculated trajectories from a storage comprises retrieving the one or more calculated trajectories from the HTTP cache located in the CDN.

5. The method of claim 1 wherein the sending the HTTP response comprises sending the HTTP response via the HTTP cache located in the CDN.

6. The method of claim 1, wherein the first and the second positions comprise first and second quantized positions.

7. The method of claim 1, wherein the sending the HTTP request for trajectories between the first position and the second position comprises sending the HTTP request for trajectories between positions within a tolerance from the first and second positions.

8. The method of claim 1, further comprising concatenating, by the first Web server, the one or more calculated trajectories and/or a trajectory already stored at the local cloud location.

9. The method of claim 1, further comprising calculating, by the first Web server, a trajectory segment for covering one or more identified trajectory gaps between requested and calculated trajectories by extrapolating or interpolating one or more calculated or already stored trajectories.

10. A method for a first Web server controlling a robot device across a Web interface in a cloud, the method comprising the first Web server:
sending, across the Web interface and towards a second Web server located in a remote cloud location, a hyper-text transfer protocol (HTTP) request for one or more calculated trajectories between a first position and a second position for the robot device, wherein the HTTP request comprises a workspace of the robot device and a configuration of the robot device encoded in unified resource location (URL);
receiving, from the second Web server, a HTTP response to the HTTP request, wherein the HTTP response comprises the one or more calculated trajectories, and wherein the one or more calculated trajectories are obtained by the second Web server by:
obtaining precision information of the one or more calculated trajectories, wherein the precision information is provided in response to a requested or a predefined tolerance, and wherein the one or more calculated trajectories are obtained dependent on the obtained precision information and that the age of the calculated trajectories is smaller than a maximum age of the one or more calculated trajectories; and
executing a trajectory that is at least based on the one or more calculated trajectories for the robot device.

11. A method for a second Web server controlling a robot device across a Web interface in a cloud, the method comprising:
receiving, from a first Web server, a hyper-text transfer protocol (HTTP) request for one or more trajectories between a first position and a second position for the robot device, wherein the HTTP request comprises a workspace of the robot device and a configuration of the robot device encoded in unified resource location (URL);
obtaining one or more calculated trajectories for the robot device between the first position and a position that is closer to the second position than the first position, based on the workspace and the configuration of the robot device, wherein the obtaining the one or more calculated trajectories for the robot device comprises:
obtaining precision information of the one or more calculated trajectories, wherein the precision information is provided in response to a requested or a predefined tolerance, and wherein obtaining the one or more calculated trajectories is dependent on the obtained precision information and that the age of the calculated trajectories is smaller than a maximum age of the one or more calculated trajectories; and
receiving, by the second Web server, the one or more calculated trajectories as a response to a call for calculation of the one or more trajectories between the first position and the second position, based on the workspace and the configuration of the robot device;

sending, across the Web interface to the first Web server located at a local cloud location, a HTTP response being a response to the HTTP request, wherein the HTTP response comprises the one or more calculated trajectories, wherein the sending the HTTP response comprises sending the HTTP response via a HTTP cache located in a content delivery network (CDN); and storing the one or more calculated trajectories in the HTTP cache.

12. A first Web server adapted to control a robot device over a Web interface in a cloud, the first Web server comprising:

processing circuitry;

memory containing instructions executable by the processing circuitry whereby the first Web server is operative to:

send, across the Web interface and towards a second Web server located in a remote cloud location, a hyper-text transfer protocol (HTTP) request for one or more trajectories between a first position and a second position for the robot device, wherein the HTTP request comprises a workspace of the robot device and a configuration of the robot device encoded in unified resource location (URL);

receive, from the second Web server, a HTTP response to the HTTP request, wherein the HTTP response comprises the one or more calculated trajectories, and wherein the one or more calculated trajectories are obtained by the second Web server by:

obtaining precision information of the one or more calculated trajectories, wherein the precision information is provided in response to a requested or a predefined tolerance, and wherein the one or more calculated trajectories are obtained dependent on the obtained precision information and that the age of the calculated trajectories is smaller than a maximum age of the one or more calculated trajectories; and execute a trajectory that is at least based on the one or more calculated trajectories for the robot device.

13. A second Web server adapted to control a robot device over a Web interface in a cloud, the Web second server comprising:

processing circuitry;

memory containing instructions executable by the processing circuitry whereby the second Web server is operative to:

receive, from a first Web server, a hyper-text transfer protocol (HTTP) request for one or more trajectories between a first position and a second position for the robot device, wherein the HTTP request comprises a workspace of the robot device and a configuration of the robot device encoded in unified resource location (URL);

obtain one or more calculated trajectories for the robot device between the first position and a position that is closer to the second position than the first position, based on the workspace and the configuration of the robot device, wherein to obtain the one or more calculated trajectories for the robot device, the processing circuitry is further configured to:

obtain precision information of the one or more calculated trajectories, wherein the precision information is provided in response to a requested or a predefined tolerance, and wherein the one or more calculated trajectories are obtained dependent on the obtained precision information and that the age of the calculated trajectories is smaller than a maximum age of the one or more calculated trajectories; and receive the one or more calculated trajectories as a response to a call for calculation of the one or more trajectories between the first position and the second position, based on the workspace and the configuration of the robot device;

send, across the Web interface and towards the first Web server located in a local cloud location, a HTTP response being a response to the HTTP request, wherein the HTTP response comprises the one or more calculated trajectories, wherein the HTTP response is sent to the first Web server via a HTTP cache located in a content delivery network (CDN); and storing the one or more calculated trajectories in the HTTP cache.

* * * * *